April 1, 1930.     O. E. BUCKLEY     1,752,413
SIGNALING CABLE
Filed July 31, 1928
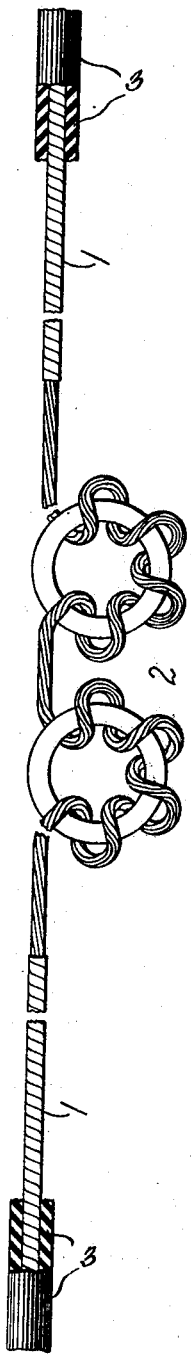
INVENTOR
*Oliver E. Buckley*
BY *J. W. Schmied*
ATTORNEY Patented Apr. 1, 1930

1,752,413

UNITED STATES PATENT OFFICE

OLIVER E. BUCKLEY, OF MAPLEWOOD, NEW JERSEY, ASSIGNOR TO BELL TELEPHONE LABORATORIES, INCORPORATED, OF NEW YORK, N. Y., A CORPORATION OF NEW YORK

SIGNALING CABLE

Application filed July 31, 1928. Serial No. 296,539.

This invention relates to loaded signaling cables such as telephone, telegraph or composite cables of transoceanic or shorter length.

The flux density in the ferromagnetic material, for a given current, is relatively low for a continuously loaded cable in which the ferromagnetic material is wrapped around the conductor and relatively high for a coil loaded cable in which the ferromagnetic material is used as cores of loading coils.

Excessive flux density in the ferromagnetic material gives rise to excessive hysteresis loss, distortion and modulation effects especially in the terminal sections of the cable where the current may be large.

An object of the invention is to reduce difficulties encountered at the sending end of cables from excessive flux density in the loading material resulting in excessive hysteresis loss, distortion and other difficulties.

Another object is to increase the efficiency of operation of signaling cables.

The above and other objects are accomplished by providing a cable which is coil loaded in the central portion, where the current is always small, and continuously loaded on the terminal portions. The principal advantages of coil loading may thereby be obtained without introducing undesirable ferromagnetic effects which would make coil loading inefficient on the terminal sections. The impedance of the coil loaded portion will match as nearly as possible the impedance of the continuously loaded portion adjacent thereto. For example, in a translantic telephone or high speed telegraph cable the continuously loaded portion at each end may be 100 miles, more or less. In the case of cables of greater or lesser length the continuously loaded terminal portions may be correspondingly increased or decreased as circumstances may require. The continuously loaded portion may have the loading tapered in a known manner if desired. Furthermore, it is within the scope of the invention to have a short section immediately adjacent a terminal unloaded, this followed by continuously loaded section connected in turn to the coil loaded central portion of the cable. Such cables may be used with long or short sea-earth connections of well-known type and they can be combined with networks having a portion adapted to balance the continuously loaded sections and another portion adapted to balance the coil loaded portion. For cables to be used exclusively for transmission in one direction it may be sufficient to have a terminal near the transmitter alone continuously loaded.

A cable in accordance with the invention is shown in the drawing, the continuously loaded terminal portions being designated by numeral 1 and the central coil loaded portion being designated by the numeral 2. The loaded cable is insulated in the usual manner with plastic material 3.

What is claimed is:

1. The method of reducing losses in the loaded material of a long loaded signal conductor which comprises obtaining the desired inductance at a terminal section where heavy currents are transmitted while, at the same time, reducing the flux density below a value at which large losses occur by loading the terminal section uniformly, and concentrating the loading of a section more remote from that terminal and which section transmits relatively small currents at spaced points in said more remote section.

2. A long loaded signal conductor having a section on which transmitting currents of large magnitude are impressed continuously loaded and a section immediately adjacent thereto but more remote from the transmitting point lump loaded, the terminal impedance of the continuously loaded section at the point of connection with said adjacent section matching that of said adjacent section at the same point.

3. A loaded signaling conductor having a portion adjacent a transmitting terminal continuously loaded and a portion more remote from said terminal coil loaded.

4. A loaded telephone cable having a portion within a distance of the order of one hundred miles from a transmitting terminal continuously loaded and a portion adjacent thereto but more remote from said terminal coil loaded.

In witness whereof, I hereunto subscribe my name this 25th day of July, 1928.

OLIVER E. BUCKLEY.